INVENTOR
P. F. WARNER
BY Young & Quigg
ATTORNEYS

United States Patent Office 3,340,324
Patented Sept. 5, 1967

3,340,324
PROCESS OF CONVERTING MERCAPTANS
TO DISULFIDES
Paul F. Warner, Phillips, Tex., assignor to Phillips
Petroleum Company, a corporation of Delaware
Filed Apr. 26, 1965, Ser. No. 450,808
8 Claims. (Cl. 260—608)

This invention relates to a method for making organic disulfides.

Heretofore, in making certain organic disulfides such as di-tert-butyl disulfides, the mercaptan, i.e. tert butyl mercaptan, is oxidized with cupric chloride dissolved in a methyl Carbitol. This process, sometimes called the copper chloride process, is relatively expensive, relatively slow, and is generally not amenable to the use of low molecular weight thiols due to excessive off-gas losses.

The oxidation of a thiol to a disulfide by the use of elemental sulfur has been suggested utilizing very small amounts of sodium hydroxide, i.e. on the order of about one molecular equivalent. However, it was found that when the general reaction is carried out substantial amounts of tri- and polysulfides are formed at the expense of the desired disulfide. Thus, this reaction is not considered desirable for the production of disulfides due to its low production of disulfides and the problems inherent in removing therefrom tri- and polysulfides. For example, trisulfides are not reduced to the disulfides except in the presence of certain materials and then only at rather elevated temperatures (about 350° F. and up).

Quite surprisingly, it has been found that organic disulfides in good yields can be produced by reacting a thiol with sulfur in the presence of an alkali metal hydroxide and an alkanol or aliphatic alcohol if the proper mol ratio of thiol to sulfur to, e.g., sodium hydroxide to, e.g., methanol is employed and the reaction carried on for a time sufficient, depending upon the temperature of reaction, to cause the reaction product to contain a substantial preponderance of the disulfide, e.g., a dialkane disulfide.

By this invention disulfides in higher yields can be obtained at a faster rate with less over-all cost. One primary cost-saving feature of this invention is the lower cost of the reactants employed. Another cost-saving feature is that with this invention conventional equipment such as that formed from carbon steel or stainless steel can be used as opposed to the glass or plastic equipment required in the copper chloride process due to the corrosivity of copper salts. Other advantages of the invention are that the process can be used with low molecular weight thiols such as methanethiol and ethanethiol without substantial off-gas loss and that in some cases a by-product is sodium sulfide which can be marketed per se.

Accordingly, it is an object of this invention to provide a new and improved method for making organic disulfides.

Other aspects, objects and the several advantages of the invention will be apparent to those skilled in the art from the description, the drawing, and the appended claims.

According to this invention at least one thiol selected from the group consisting of alkanethiols and cycloalkanethiols, preferably alkanethiols, wherein the alkane contains from 1 to 16 carbon atoms per molecule, inclusive, and the cycloalkane contains from 4 to 16 carbon atoms per molecule, inclusive, is reacted with elemental sulfur in the presence of at least one alkali metal hydroxide and at least one alkanol or aliphatic alcohol wherein the alkyl radical contains from 1 to 12, preferably from 1 to 5, carbon atoms per molecule, inclusive. In the reaction of this invention the thiol to sulfur to alkali metal hydroxide to alkanol mol ratio is represented in the form $2/X/Y/Z$, respectively, wherein X (mols of sulfur) is at least about 0.75, Y (mols of alkali metal hydroxide) is at least about 0.5, Z (mols of alkanol) is at least about 0.5 and when either one of Y or Z is about 0.5 the other is at least about 1. However, it is preferred that X vary from about 1 to about 2 and Y and Z be at least about 0.75. It is still more preferred that X be about 1, Y vary from about 1 to about 2 and Z vary from about 1 to about 5. It is to be noted that the mol ratios of this invention generally relate to minimum possible values, maximum possible values being only that which is practical since an excess of one or more reactants can be employed but presently appear to be unnecessary. However, it is preferred to use lesser amounts of the alkali metal hydroxide because:

(1) Sodium hydrosulfide (NaHS) is formed instead of sodium sulfide and the hydrosulfide is more soluble in the water-alkanol phase formed thereby preventing the formation of crystals in the reactor.

(2) Phase separation of the reaction mass is cleaner and a water wash is obviated.

(3) Yields of the disulfide are generally higher.

(4) Less cost is involved since less alkali metal hydroxide is consumed.

Suitable alkanethiols include methanethiol, ethanethiol, 2-methylethanethiol, butanethiol, 2-methylpropanethiol, 2-butanethiol, 2-methyl-2-propanethiol, octanethiol, decanethiol, dodecanethiol, tetradecanethiol, and hexadecanethiol.

Suitable cycloalkanes includes cyclobutanethiol, cyclooctanethiol, cyclodecanethiol, cyclododecanethiol, cyclotetradecanethiol, and cyclohexadecanethiol.

Suitable alkail metal hydroxides includes the hydroxides of all the alkali metals, preferably sodium, potassium, lithium and rubidium.

Suitable alkanols or aliphatic alcohols include methanol, ethanol, 1-propanol, 2-propanol, 1-pentanol, 2-pentanol, 3 - pentanol, 1,1 - dimethylpropanol, heptanol, decanol, 3-decanol, dodecanol and 1,1-dimethyloctenol.

Although not completely understood and therefore not desiring to be bound thereby it presently appears that the thiol is first transformed to tri- and polysulfides and then the tri- and polysulfides degrade to the disulfide under the influence of the alkali metal hydroxide and alkanol.

In all three figures the mol ratio of 2-methyl-2-propanethiol to sulfur to sodium hydroxide to methanol is 2:1:1:1.

Figure 1:
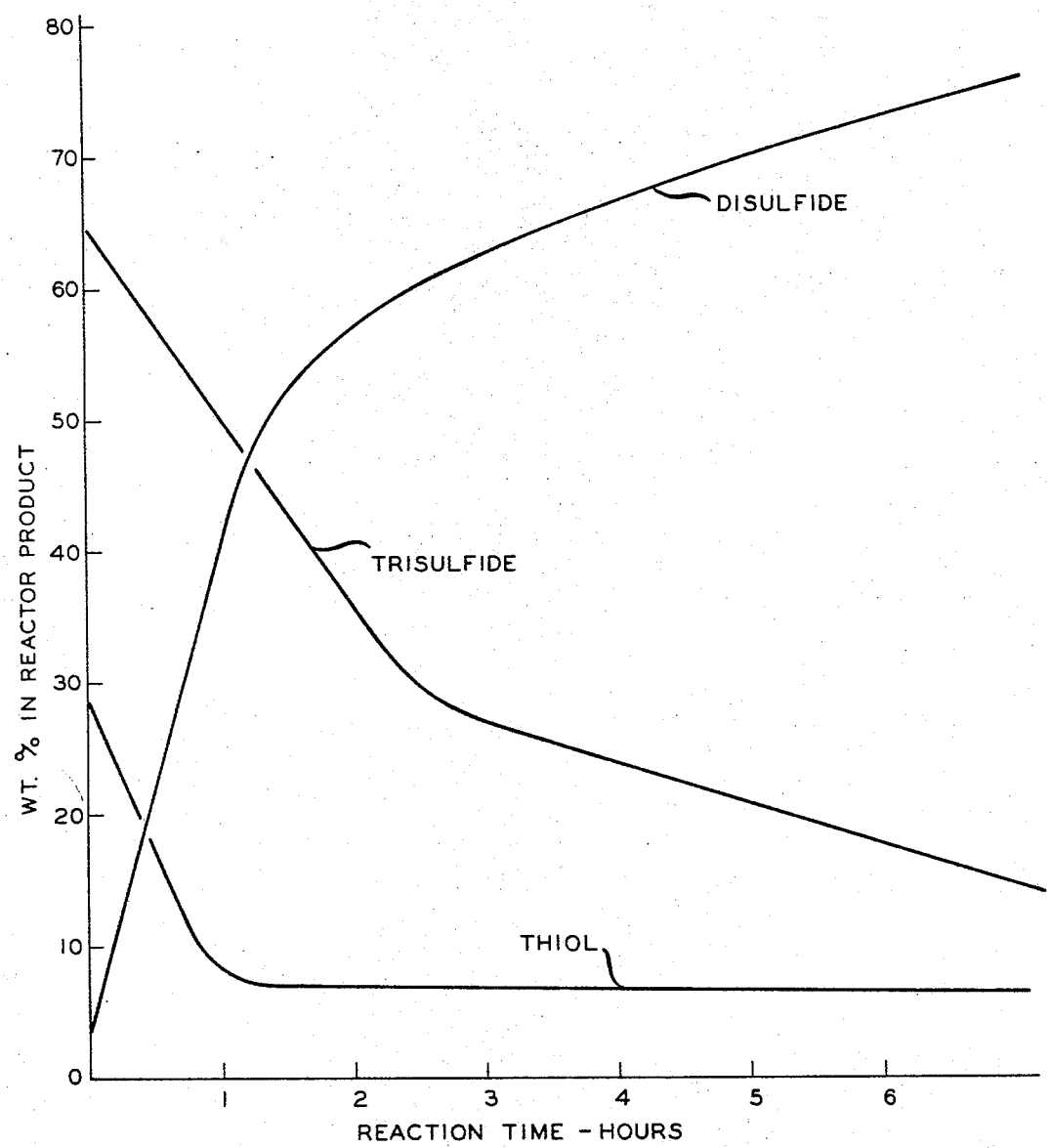
FIGURE 1 shows in graphic form the reaction rate of this invention for 2-methyl-2-propanethiol with sulfur at 150° F.

Referring to FIGURE 1 it can be seen that initially a large amount of trisulfide and a small amount of disulfide is formed but that after approximately 1.2 hours substantially equal amounts of trisulfide and disulfide are formed and the amount of disulfide present relative to the trisulfide increases with increasing reaction time.

Figure 2:
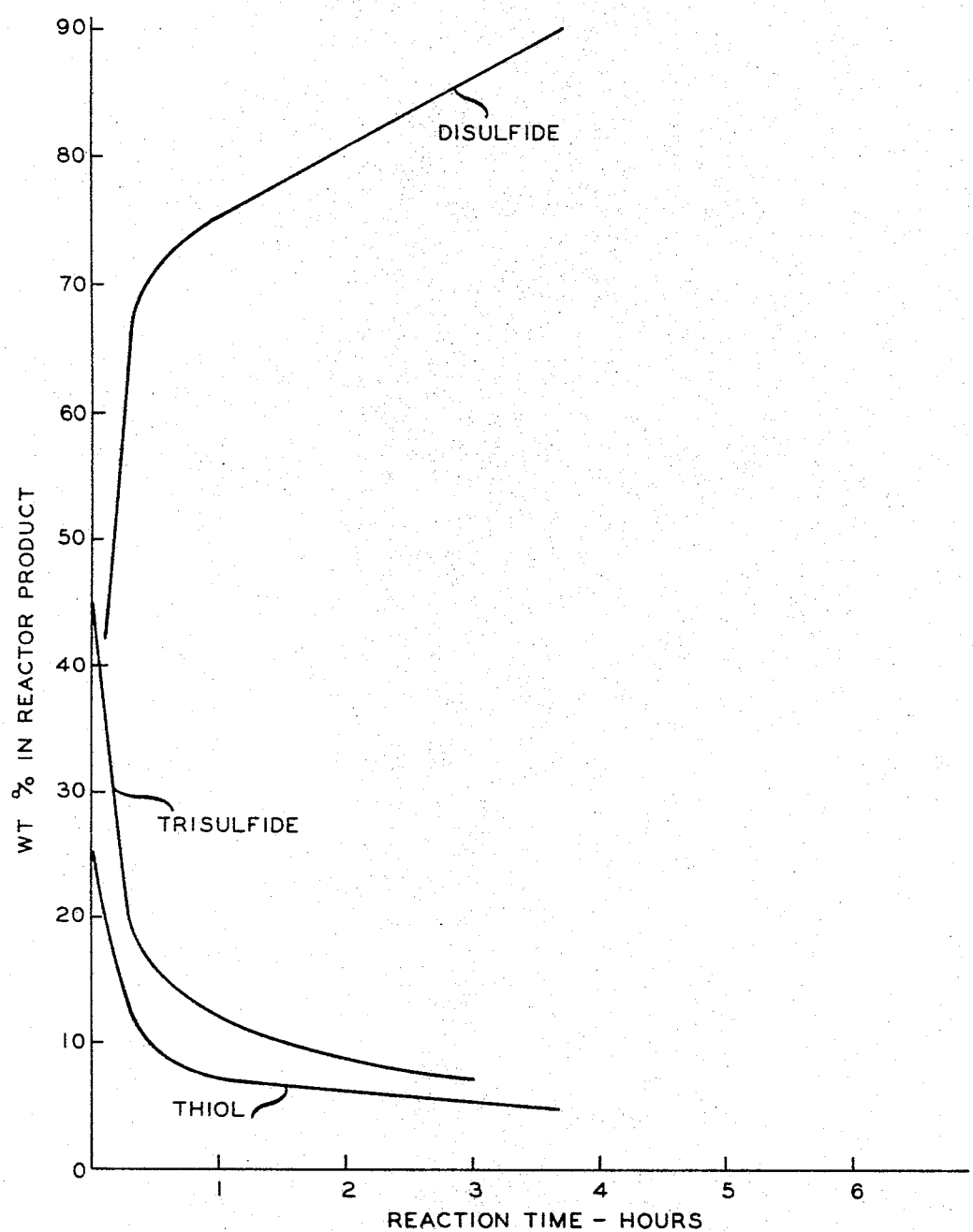
FIGURE 2 shows in graphic form the reaction rate of this invention for 2-methyl-2-propanethiol with sulfur at 200° F.

FIGURE 2 shows that at higher reaction temperature than FIGURE 1 inititally more trisulfide is present than disulfide but that after about one-tenth hour more disulfide is present than trisulfide.

Figure 3:
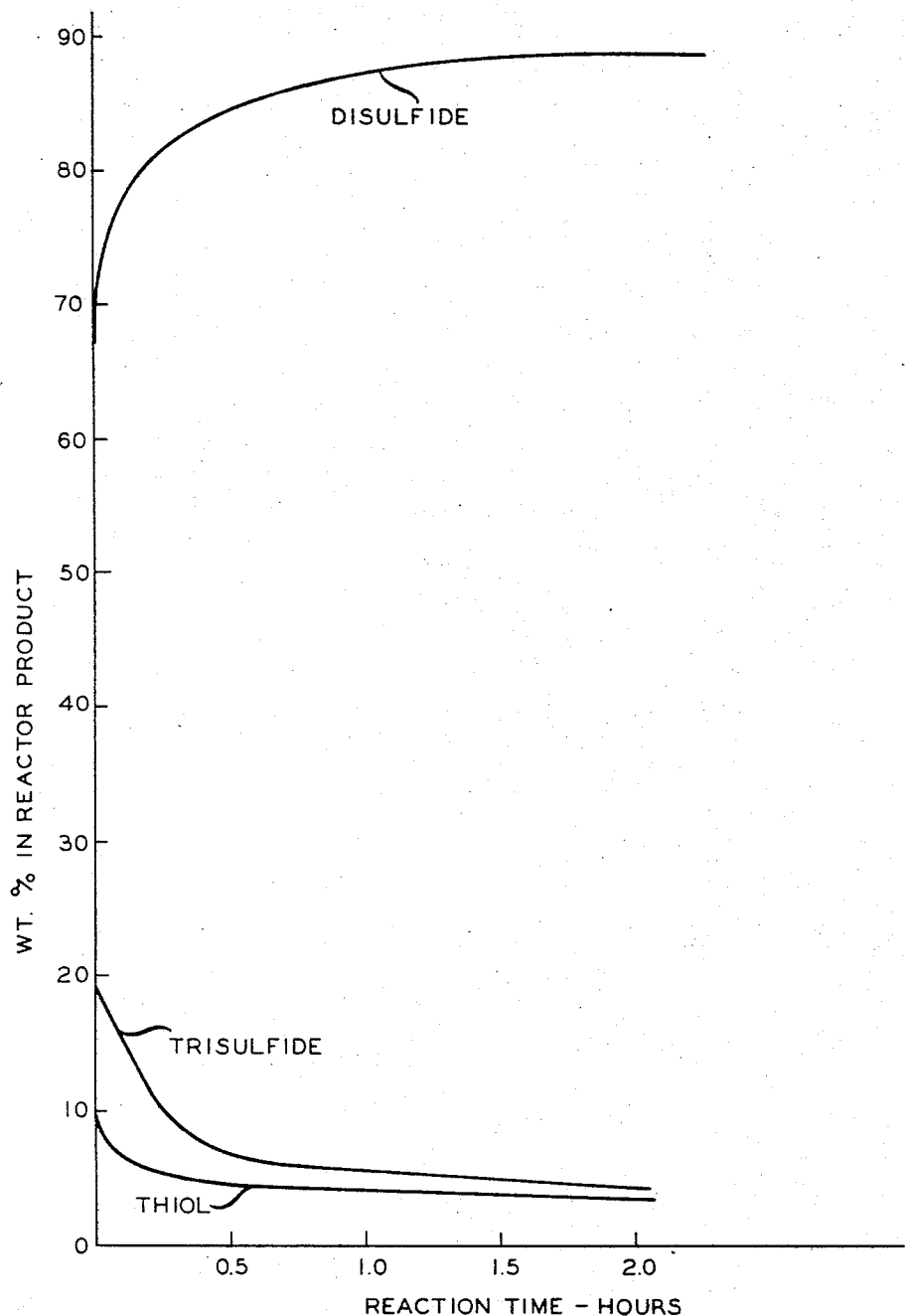
FIGURE 3 shows in graphic form the reaction rate of this invention for 2-methyl-2-propanethiol with sulfur at 250° F.

FIGURE 3 shows that for an even higher reaction temperature than that of FIGURE 2 the initial formation of larger amounts of trisulfide followed by degradation to the disulfide is quite fast but that the ultimate result of the reaction is still a large yield of the disulfide.

Thus, the conditions for the reaction of this invention can vary widely depending upon the materials employed, the yield desired and the like, a primary requirement being that the reaction is carried out for a length of time sufficient, at the reaction temperature, to cause the final product to contain a substantial preponderance of disulfide relative to trisulfide. Generally, the temperature can be adjusted to vary the reaction time to meet a desired period of time and will vary from about 65 to about 350° F., preferably from about 100 to about 300° F. The pressure can also vary widely depending upon various parameters but will generally be from about ambient pressure to 150 p.s.i.g., preferably from about 3 to about 120 p.s.i.g.

*Example 1*

Varying amounts of 2-methyl-2-propanethiol, sulfur, sodium hydroxide, methanol, water and monoethanolamine were reacted under varying conditions. The results of these reactions are set forth in Table I as follows:

TABLE I

| | Column | | | | | | |
|---|---|---|---|---|---|---|---|
| | A | | | | B | | |
| SubColumn (Runs) | 1 | 2 | 3 | 4 | 5 | 6 | 7 |
| Charge Data: | | | | | | | |
| 2-methyl-2-propanethiol, mols | 2.0 | 2.0 | 2.0 | 2.0 | 2.0 | 2.0 | 2.0 |
| Sulfur, mols | 1.1 | 1.1 | 1.1 | 1.1 | 1.0 | 1.0 | 1.0 |
| Sodium hydroxide, mols | | 2.0 | 2.0 | | 0.25 | 0.25 | 0.5 |
| Methanol, mols | | | | 5.0 | 0.25 | 0.25 | 0.5 |
| Water, mols [9] | | | 11.1 | | | | |
| Monoethanolamine, ml.[8] | 2.0 | | | | | | |
| Conditions: | | | | | | | |
| Time, hours | 2 | 2 | 2 | 2 | 2 | 2 | 2 |
| Temperature, °F | 200 | 200 | 200 | 200 | 250 | 250 | 250 |
| Pressure, p.s.i.g | 101 | 30 | 10 | 93 | 113 | [2] 50 | 90 |
| Mol ratio, RSH/NaOH | | 1 | 1 | | 8 | 8 | 4 |
| Recovery, gm | 192 | 150 | 120 | 193 | 182 | [3] 187 | 178 |
| Mol percent | [4A] 108 | [4A] 84 | [4A] 67 | [4A] 108 | [4B] 102 | [4B] 105 | [4B] 100 |
| Product Composition, Wt. Percent: [7] | | | | | | | |
| 2-methyl-2-propanethiol | 71.2 | 56.5 | 3.4 | 49.1 | 17.6 | 17.5 | 29.8 |
| Di-tert-butyl-disulfide | Tr. | 1.0 | 34.4 | 0.6 | 1.2 | 9.0 | 13.9 |
| Di-tert-butyl trisulfide | 15.0 | 41.1 | 58.9 | 45.9 | 70.7 | 67.8 | 51.4 |
| Di-tert-butyl polysulfide | 12.5 | Tr. | 0.2 | 2.5 | ([6]) | ([6]) | ([6]) |
| Other | 1.3 | 1.4 | 3.1 | 1.9 | 10.5 | 5.7 | 4.9 |

| | Column | | | | | | | |
|---|---|---|---|---|---|---|---|---|
| | C | | | | D | | E | F |
| SubColumn (Runs) | 8 | 9 | 10 | 11 | 12 | 13 | 14 | 15 | 16 [5] |
| Charge Data: | | | | | | | | | |
| 2-methyl-2-propanethiol, mols | 2.0 | 2.0 | 2.0 | 2.0 | 2.0 | 2.0 | 2.0 | 2.0 | 2.0 |
| Sulfur, mols | 1.0 | 1.0 | 1.0 | 1.0 | 1.1 | 1.1 | 1.1 | 1.1 | 1.0 |
| Sodium hydroxide, mols | 1.0 | 1.0 | 1.2 | 1.5 | 2.0 | 2.0 | 2.0 | 2.0 | 1.0 |
| Methanol, mols | 1.0 | 1.0 | 1.0 | 1.0 | 0.5 | 1.0 | 2.5 | 5.0 | 1.0 |
| Water, mols [9] | | [1] 2.2 | | | | | 5.6 | | |
| Monoethanolamine, ml.[8] | | | | | | | | | |
| Conditions: | | | | | | | | | |
| Time, hours | 2 | 2 | 2 | 2 | 2 | 2 | 2 | 2 | 2 |
| Temperature, °F | 250 | 250 | 250 | 250 | 200 | 200 | 202 | 200 | 250 |
| Pressure, p.s.i.g | 40 | 47 | 40 | 40 | 12 | 10 | 5 | 10 | 75 |
| Mol ratio, RSH/NaOH | 2 | 2 | 1.66 | 1.33 | 1 | 1 | 1 | 1 | 2 |
| Recovery, gm | 166 | 168 | 150 | 149 | 147 | 118 | 130 | 108 | |
| Mol percent | [4B] 93.5 | [4B] 94 | [4B] 84 | [4B] 84 | [4A] 83 | [4A] 66 | [4A] 73 | [4A] 61 | |
| Product Composition, Wt. Percent: [7] | | | | | | | | | |
| 2-methyl-2-propanethiol | 1.9 | 5.6 | 0.9 | 1.6 | 1.6 | 0.9 | 1.1 | 0.8 | 38.6 |
| Di-tert-butyl disulfide | 92.1 | 82.0 | 96.3 | 95.4 | 84.0 | 96.4 | 84.1 | 92.8 | 34.2 |
| Di-tert-butyl-trisulfide | 4.4 | 10.5 | 1.8 | 0.9 | 12.2 | 0.8 | 10.5 | 2.5 | 21.7 |
| Di-tert-butyl polysulfide | ([6]) | ([6]) | ([6]) | ([6]) | 0.2 | 0.3 | 0.1 | Tr. | ([6]) |
| Other | 1.6 | 1.9 | 1.0 | 2.1 | 2.0 | 2.6 | 4.2 | 3.9 | 5.5 |

[1] Equivalent to 50 wt. percent NaOH in water.
[2] Pressure kept at about 50 p.s.i.g. by venting H₂S through a Dry-Ice trap as it was formed.
[3] Of this amount 2.7 gm. was collected in Dry-Ice trap.
[4A] Based on theoretical amount of disulfide.
[4B] Based on stoichiometric disulfide.
[5] The NaOH, sulfur, and methanol were reacted at 250° F. for 2 hours, then the thiol was added and the reaction was continued at 250° F. for 2 more hours.
[6] Undetermined, included in "Other".
[7] Determined by chromatographic analysis.
[8] Added as reaction catalyst since no base was otherwise present.
[9] In lieu of methanol as reaction medium.

It can be seen from Table I, Column A, that very low yields of disulfide were obtained when one or both of sodium hydroxide and methanol were absent from the reaction. It can also be seen from Column B that even when both sodium hydroxide and methanol were present in the reaction very low yields of disulfide were obtained even though the sodium hydroxide and methanol were present in amounts up to 0.5 mol. It can further be seen from Columns C and E that very high yields of disulfide were obtained when at least one mol of sodium hydroxide and methanol were present. It should be noted that Run 13 in Column E yields 96.4 weight percent di-tert-butyl disulfide. It should also be noted that Runs 13 and 15 in Column A, as with similar high runs in Column C, require only final sweetening, i.e. removal of thiols and/or hydrogen sulfide to make the product marketable. Thus, expensive post reaction treatments are unnecessary.

Column D shows that a high yield of disulfide was obtained when only 0.5 mol of methanol was present but a large amount of sodium hydroxide also was present. Thus, good yields can be obtained when one of the sodium hydroxide and methanol is present in an amount as low as 0.5 mol if the other is present in larger amounts, preferably at least one mol.

Column F shows that a low yield was obtained when the sodium hydroxide sulfur and methanol were reacted under normal invention reaction conditions prior to the addition of the thiol.

*Example II*

Plant capacity runs employing the invention were carried out employing the following recipe:

| | Pounds/mols |
|---|---|
| 2-methyl-2-propanethiol | 52.5 |
| Sulfur | 28.1 |
| Sodium hydroxide | 28.8 |
| Methanol | 28.1 |

The batch reaction time was 3 hours at 200–250° F. At the end of the reaction, the stirrer was shut down and the methanol phase was drawn off. Various phases in the reaction products separate cleanly and a water wash was unnecessary. A typical gas chromatographic analysis of the product at this point is as follows:

| | Weight percent |
|---|---|
| 2-methyl-2-propanethiol | 3.8 |
| Di-tert-butyl disulfide | 91.1 |
| Di-tert-butyl trisulfide | 4.1 |
| Other remainder. | |

After the separation of phases the reaction mixture is subjected to a pressure of 10 millimeters of mercury at 140° F. to remove substantially all of the unreacted mercaptan. The product is then pumped to a storage tank and sweetened by continuously passing a small stream thereof over cupric chloride until the contents of the tank have been so treated. The product is "water white," i.e. clear, and has the following properties and composition. For comparative purposes the properties and composition of a product from the copper chloride process is also shown:

| | Process | |
|---|---|---|
| | Invention | Copper Chloride |
| Total sulfur, Wt. percent | 36.5 | 37.3 |
| Specific gravity 60/60, ° F | 0.9290 | 0.9356 |
| Flash point, ASTM D92-57, ° F | Above 150 | Above 150 |
| Doctor Test | Sweet | Sweet |
| Copper content, p.p.m. | 12 | |
| Distillation, ASTM D86-61, ° F.: | | |
| IBP | 373 | 374 |
| 5 [1] | 378 | 380 |
| 10 | 379 | 382 |
| 20 | 380 | 383 |
| 30 | 381 | 384 |
| 40 | 381 | 385 |
| 50 | 381 | 386 |
| 60 | 382 | 387 |
| 70 | 382 | 388 |
| 80 | 382 | 391 |
| 90 | 384 | 399 |
| 95 | 386 | 414 |
| EP | 393 | 436 |
| Composition,[2] Wt. percent: | | |
| Di-tert-butyl disulfide | 95.6 | 89.2 |
| Di-tert-butyl trisulfide | 1.4 | 8.3 |
| Other | Remainder | Remainder |

[1] Cubic centimeters recovered.
[2] Determined by chromatographic analysis.

From the above data, particularly the distillation data, it can be seen that the purity of the invention product is considerably higher and the trisulfide and polysulfide (other, inter alia) contents are substantially lower. The purity of the product of the invention allows it to easily meet standard copper strip corrosion test specifications.

Reasonable variations and modifications are possible within the scope of this disclosure without departing from the spirit and scope thereof.

I claim:
1. A method for producing disulfides comprising reacting at least one material selected from the group consisting of alkanethiols and cycloalkanethiols with sulfur in the presence of at least one alkali metal hydroxide and at least one alkanol, the thiol to sulfur to alkali metal hydroxide to alkanol mol ratio being of the form $2/X/Y/Z$, respectively, wherein X is at least about 0.75 and Y and Z are at least about 0.5 but when either one of Y and Z is about 0.5 the other is at least about 1, said reaction being carried out at a temperature and for a time sufficient to cause the reaction product to contain a substantial preponderance of dialkanedisulfide.

2. The method according to claim 1 wherein X varies from 1 to 2, Y and Z are each at least 0.75 and the temperature is in the range of from about 65 to about 350° F.

3. The method according to claim 1 wherein X is about 1, Y varies from about 1 to about 2, Z varies from about 1 to about 5 and the temperature is in the range of from about 100 to about 300° F.

4. A method for producing disulfides comprising reacting at least one alkanethiol wherein the alkane contains from 1 to 16 carbon atoms per molecule, inclusive, with elemental sulfur in the presence of at least one alkali metal hydroxide and at least one alkanol containing from 1 to 5 carbon atoms per molecule, inclusive, the thiol to sulfur to alkali metal hydroxide to alkanol ratio being of the form $X/Y/Z$, respectively, wherein X is at least about 0.75 and Y and Z are at least about 0.5 but when either one of Y and Z is about 0.5 the other is at least about 1, said reaction being carried out at an elevated temperature and for a time sufficient to cause the reaction product to contain a substantial majority of dialkanedisulfide.

5. The method according to claim 4 wherein X is from about 1 to about 2, Y and Z are at least about 0.75, the temperature is in the range of from 65 to about 350° F., and the pressure is in the range of from ambient to about 150 p.s.i.g.

6. The method according to claim 4 wherein X is about 1, Y is from about 1 to about 2, Z is from about 1 to about 5, the temperature is in the range of from about 100 to about 300° F., and the pressure is in the range of from about 3 to about 120 p.s.i.g.

7. A method for producing di-tert-butyl disulfide comprising reacting 2-methyl-2-propanethiol with elemental sulfur in the presence of sodium hydroxide and methanol, the thiol to sulfur to sodium hydroxide to methanol ratio being of the form $2/X/Y/Z$, respectively, wherein X is from about 1 to about 2, and Y and Z are at least about 0.75, said reaction being carried out at a temperature in the range of from about 100 to about 300° F. and for a time sufficient to cause the reaction product to contain substantial majority of said disulfide.

8. The method according to claim 7 wherein X, Y and Z are each about 1, said temperature of reaction is from about 200 to about 250° F. and said time of reaction is at least two hours.

No references cited.

CHARLES B. PARKER, *Primary Examiner.*

D. R. PHILLIPS, *Assistant Examiner.*